United States Patent
Cheng

(10) Patent No.: US 12,205,191 B2
(45) Date of Patent: Jan. 21, 2025

(54) WATERMARK ADDING METHOD AND APPARATUS, STORAGE MEDIUM, AND DEVICE

(71) Applicant: ZHEJIANG UNIVIEW TECHNOLOGIES CO., LTD., Zhejiang (CN)

(72) Inventor: Changhui Cheng, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 194 days.

(21) Appl. No.: 17/909,109

(22) PCT Filed: Apr. 22, 2020

(86) PCT No.: PCT/CN2020/086050
§ 371 (c)(1),
(2) Date: Sep. 2, 2022

(87) PCT Pub. No.: WO2021/174651
PCT Pub. Date: Sep. 10, 2021

(65) Prior Publication Data
US 2023/0099691 A1    Mar. 30, 2023

(30) Foreign Application Priority Data
Mar. 4, 2020 (CN) .......................... 202010143548.7

(51) Int. Cl.
*H04N 21/81* (2011.01)
*G06T 1/00* (2006.01)
*H04N 21/80* (2011.01)

(52) U.S. Cl.
CPC ...................... *G06T 1/0085* (2013.01); *G06T 2207/10016* (2013.01)

(58) Field of Classification Search
CPC ......... G06T 1/0085; G06T 2207/10016; G06T 1/00; G06T 1/0021; H04N 21/8358;
(Continued)

(56) References Cited

U.S. PATENT DOCUMENTS

| | | | |
|---|---|---|---|
| 10,448,122 B1 | 10/2019 | Kuznetsov et al. | |
| 2008/0037954 A1 | 2/2008 | Lee et al. | |

(Continued)

FOREIGN PATENT DOCUMENTS

| | | |
|---|---|---|
| CN | 1652604 A | 8/2005 |
| CN | 101622867 A | 1/2010 |

(Continued)

OTHER PUBLICATIONS

Chinese Office Action in application No. 202010143548.7 dated Apr. 6, 2022, 8 pages including translation.
International Search Report in application PCT/CN2020/086050 dated Dec. 3, 2020, 4 pages, including translation.
(Continued)

*Primary Examiner* — Daquan Zhao
(74) *Attorney, Agent, or Firm* — Morgan, Lewis & Bockius LLP

(57) ABSTRACT

Provided are a watermark adding method and apparatus, a storage medium and a device. The method includes steps described below. To-be-added watermark information is acquired, and a time offset is determined according to the watermark information; a video frame rate is acquired, and time information of a frame image in a video is determined according to the video frame rate; and offset processing is performed on the time information according to the time offset to add the watermark information to the video.

19 Claims, 2 Drawing Sheets

(58) Field of Classification Search
CPC ........ H04N 21/83; H04N 21/81; H04N 21/80; H04N 21/8355
USPC ................................. 386/260, 239, 248, 252
See application file for complete search history.

(56) References Cited

U.S. PATENT DOCUMENTS

| | | |
|---|---|---|
| 2013/0151856 A1 | 6/2013 | Petrovic et al. |
| 2014/0280265 A1* | 9/2014 | Wang .................... H04H 60/37 707/758 |
| 2016/0277793 A1* | 9/2016 | Eyer ..................... H04H 60/73 |
| 2020/0068238 A1 | 2/2020 | Babannavar et al. |

FOREIGN PATENT DOCUMENTS

| | | |
|---|---|---|
| CN | 102077584 A | 5/2011 |
| CN | 102959544 A | 3/2013 |
| CN | 105898323 A | 8/2016 |
| CN | 107911641 A | 4/2018 |
| EP | 2116047 A1 | 11/2009 |
| WO | WO2008/107731 A1 | 9/2008 |

OTHER PUBLICATIONS

Extended European Search Report of Application No. 20922684.4, dated Apr. 9, 2024, 9 pages.
Gasior, Wade C et al: "Network covert channels on the Android platform", Proceedings of the Seventh Annual Workshop On Cyber Security and Information Intelligence Research, CSIIRW'11, Oct. 12, 2011 (Oct. 12, 2011), pp. 1-4.

* cited by examiner

WATERMARK ADDING METHOD AND APPARATUS, STORAGE MEDIUM, AND DEVICE

CROSS REFERENCE TO RELATED APPLICATIONS

This is a National Stage Application filed under 35 U.S.C. 371 based on International Patent Application No. PCT/CN2020/086050, filed on Apr. 22, 2020, which claims priority to Chinese Patent Application No. 202010143548.7 filed on Mar. 4, 2020, the disclosures of both of which are incorporated herein by reference in their entireties

TECHNICAL FIELD

Embodiments of the present application relate to the field of computer technologies, for example, a watermark adding method and apparatus, a storage medium and a device.

BACKGROUND

In daily life, it is more intuitive to use videos as the transmission carrier of information, and people can obtain many pieces of information by watching videos and listening to the sound in the videos. Sometimes, to determine the source of the video, to track the way of generating the video, or for the purpose of publicity, some watermark information will be embedded in many videos. For example, watermarks are added to frame images in a video. In this manner for adding watermarks, although the purpose of embedding watermarks is achieved, information of frame images in the video is damaged, and the repair is relatively complicated. Moreover, the watermarks added in this manner can be directly observed by any user, so that this manner is not applicable to the scene requiring a secret manner for adding watermarks.

SUMMARY

Embodiments of the present disclosure provide a watermark adding method and apparatus, a storage medium and a device.

The embodiments of the present application provide a watermark adding method. The method includes steps described below.

To-be-added watermark information is acquired, and a time offset is determined according to the watermark information.

A video frame rate is acquired, and time information of a frame image in a video is determined according to the video frame rate.

Offsetting processing is performed on the time information according to the time offset to add the watermark information to the video.

The embodiments of the present application provide a watermark adding apparatus. The apparatus includes a time offset determination module, a time information acquisition module and a watermark information adding module.

The time offset determination module is configured to acquire watermark information to be added, and determine a time offset according to the watermark information.

The time information acquisition module is configured to acquire a video frame rate, and determine time information of a frame image in a video according to the video frame rate.

The watermark information adding module is configured to perform offset processing on the time information according to the time offset to add the watermark information to the video.

The embodiments of the present application provide a non-transitory computer-readable storage medium configured to store a computer program which, when executed by a processor, implements the watermark adding method of the embodiments of the present application.

The embodiments of the present application provide a device including a memory, a processor and a computer program stored in the memory and executable on the processor, where the processor, when executing the computer program, implements the watermark adding method of the embodiments of the present application.

DETAILED DESCRIPTION

Figure 1:
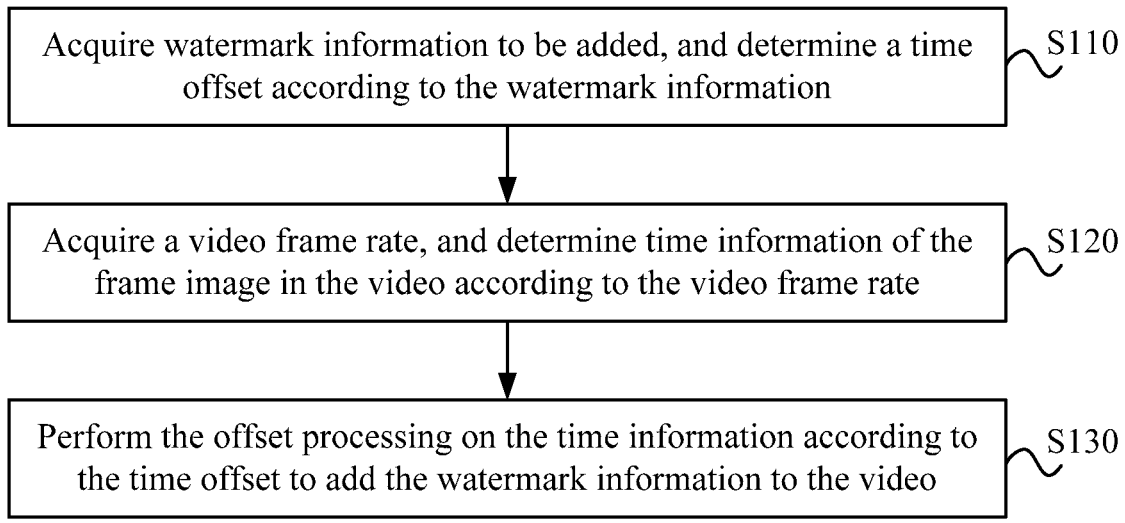
FIG. 1 is a flowchart of a watermark adding method according to an embodiment of the present application.

The present application is described below in conjunction with drawings and embodiments. The embodiments described herein are merely intended to explain and not to limit the present application. In addition, for ease of description, only part, not all, of structures related to the present application are illustrated in the drawings.

Before the example embodiments are discussed, it is to be noted that some of the example embodiments are described as processing or methods depicted in flowcharts. Although multiple steps are described as sequential processing in the flowcharts, many of the steps in the flowcharts may be implemented concurrently, coincidentally or simultaneously. Additionally, the sequence of the multiple steps may be rearranged. The processing may be terminated when operations are completed, but the processing may further have additional steps which are not included in the drawings. The processing may correspond to a method, a function, a procedure, a subroutine, a subprogram or the like.

FIG. 1 is a flowchart of a watermark adding method according to an embodiment of the present application. The embodiment is applicable to a case of watermark adding. The method may be executed by a watermark adding apparatus provided in an embodiment of the present application. The apparatus may be implemented by means of software and/or hardware and may be integrated in devices such as a network camera.

As shown in FIG. 1, the watermark adding method includes steps described below.

In S110, watermark information to be added is acquired, and a time offset is determined according to the watermark information.

In an embodiment, the watermark information may be advertisement information such as information composed of text and numbers, or may be information related to the manner in which a video is generated. For example, the video is generated by software and the video is generated at an Internet Protocol (IP) address, and thus the watermark information may include information related to the software and the IP address. In addition, the watermark information may also be information related to a generation device. For example, in a case where a video is acquired through a camera, the watermark information may include information indicative of the camera; in a case where the watermark information is embedded in the video through a server, the watermark information may include information indicative of the server, etc.

In the embodiment, optionally, the step in which the watermark information to be added is acquired, and the time offset is determined according to the watermark information includes steps described below. The watermark information to be added is acquired, and the watermark information is encoded in a preset encoding manner to obtain encoding information of at least two bits; and the time offset is determined according to the encoding information of at least two bits.

In the embodiment, the watermark information to be added is encoded in the preset encoding manner to obtain encoding information of at least two bits, that is, to obtain the watermark information embodied in a preset encoding form. For example, the device for generating a video is a network camera or other cameras, the watermark information embodied in the preset encoding form may be watermark information to be added embodied in a binary form. For example, the watermark information to be added may be converted into the binary form in the form of American Standard Code for Information Interchange (ASCII) to obtain the encoding information. Exemplarily, when the watermark information is a user name, a client IP/a media access control (MAC) address, etc., for example, when the watermark information is admin: 127.0.0.1, the following encoding information can be obtained:

0000000010010111 0000000100000000 0000000100001001 0000000100000101
0000000100010000 0000000001011000 0000000001001001 0000000001010000
0000000001010101 0000000001000110 0000000001001000 0000000001000110
0000000001001000 0000000001000110 0000000001001001.

It can be seen that the information represented in the form of ASCII is the encoding information.

In the embodiment, the time offset is determined according to the encoding information, where the number of bits of the encoding information is at least two. The time offset may be a physical quantity for performing time offsetting on time information of each frame image among multiple frame images in a video. For example, if the time interval of frame images is calculated in milliseconds, the time offset may be a certain number of milliseconds offset forward or backward. In addition, the time offset may be a proportion value, for example, the value of extended or shortened times of an original time interval. In an embodiment, the number of all bits of the encoding information may be taken as the time offset. For example, the encoding information is a binary number having 4 bits in total, and the numerical value 4 may be taken as the time offset for offsetting the time interval of all or part of frame images in the video. Alternatively, the first two bits of the encoding information may be selected as the time offset of the first frame image, and the last two bits may be selected as the time offset of the second frame image.

In the embodiment, optionally, after the watermark information is encoded in the preset encoding manner to obtain the encoding information of at least two bits, the method further includes the step described below. A head identifier and/or a tail identifier are added to the encoding information to obtain a target code. Accordingly, the step in which the time offset is determined according to the encoding information of at least two bits includes the step described below. The time offset of the frame image in the video is determined according to the target code. In conjunction with the preceding example, an identifier may be added to the head and the tail of the binary codes. For example, the identifier may be 0000000000000000, and the obtained result is:

0000000000000000
0000000010010111 0000000100000000 0000000100001001 0000000100000101
0000000100010000 0000000001011000 0000000001001001 0000000001010000
0000000001010101 0000000001000110 0000000001001000 0000000001000110
0000000001001000 0000000001000110 0000000001001001
0000000000000000.

In the technical solution, the head identifier and the tail identifier are added, thus the watermark information obtained after the head identifier and the tail identifier is added can be read more easily and accurately, thereby ensuring that the added watermark information is readable and effective.

The preceding form of ASCII is only an example, and other encoding manners may be customized.

Based on the preceding technical solution, optionally, after the time offset of the frame image in the video is determined according to the target code, the method further includes the step described below. The time offset is cyclically added.

In an embodiment, the step in which offset processing is performed on time information according to the time offset includes the step described below. The offset processing is performed on the time information according to the cyclically added time offset.

By adding the identifier as described above, the watermark information can be cyclically encoded, and the cyclically encoded watermark information may be read in a corresponding reading manner. In a case where a start identifier or an end identifier is read, a piece of information before the end identifier, a piece of information after the start identifier or a piece of information between the start identifier and the end identifier may be recognized as the watermark information. Through cyclic adding, the watermark information can be read more easily. Moreover, it can be ensured that the complete watermark information can be read in the process of reading the cyclically added watermark information, and the read watermark information can be checked through cyclic adding.

In S120, a video frame rate is acquired, and time information of the frame image in the video is determined according to the video frame rate.

In an embodiment, the frame rate of the video may be 25 frames per second, and the time interval between each frame image and another frame image may be determined as 40 ms. For example, on the time axis, the time information of the first frame image is Oms, the time information of the second frame image may be 40 ms, and so on.

In S130, the offset processing is performed on the time information according to the time offset to add the watermark information to the video.

After the time information of the frame image in the video is obtained, the time interval between each frame and the previous frame may be determined according to the time offset determined above. In an embodiment, the live frame rate may be n, and the time interval Tick between each frame and the previous frame satisfies the following formula:

Tick=1/n*1000 ms

Tick between each frame and the previous frame may be positively offset or negatively offset. It is assumed that the offset is OFFSET, and information that may be stored in each frame is OFFSET pieces of binary information. For example, OFFSET is 2, that is, the range of the actual interval is (tick−1, tick, tick+1, tick+2), and thus two pieces of binary information can be stored. Then, the watermark information obtained above may be decomposed in terms of two bits and added separately to the time information of the frame image in the video. For example, if the information added to the first frame image is 00, the information added to the second frame image is 01, and the information added to the third frame image is 10, then after offsetting, it can be obtained that the time information of the first three frame images in the video is 0ms, 41 ms and 83 ms.

The preceding offsetting will not lead to abnormal display of the video. Further, in the present application, the preceding manner for adding the watermark information to the frame interval can achieve the watermark adding in an imperceptible process.

According to the technical solution provided in the embodiment of the present disclosure, the watermark information can be embodied in the manner of the time offset. In this manner, watermark adding does not affect original information of the video and the frame image in the video and may be performed in a secret manner. Moreover, it is easy to track information such as video generation information according to the watermark information.

In the preceding technical solution, optionally, after the time information of the frame image in the video is determined according to the video frame rate, the method further includes the step described below. A total number of frame images within a unit duration is acquired. Accordingly, the step in which the offset processing is performed on the time information according to the time offset includes the step described below. Time information of the first number of frame images within the unit duration is offset according to the time offset, and offset compensation is performed on time information of the second number of frame images, where a sum of the first number of frame images and the second number of frame images is the total number of frame images within the unit duration.

In an embodiment, the unit duration may be 1 second and the total number of frame images within the unit duration is 25 frames. In the actual process of performing the offset processing, the time information of the first 10 frame images within 1 second may be offset, and the time information of the last 15 frames may be compensated. For example, the time information of the first 10 frames is increased by 30 ms, thus the time information of the first 10 frames is offset to 430 ms from the original 400 ms, and the increased 30 ms may be compensated for in the time information of the last 15 frames on average. For example, the time interval between each frame image and the previous frame image is shortened from 40 ms to 38 ms, that is, the time information of the last 15 frames is originally 600 ms and is 570 ms after the offset compensation. In this manner, after the offsetting, it can be ensured that the number of frames per second is fixed without the phenomenon of frame skipping.

In the preceding technical solution, optionally, the step in which the offset compensation is performed on the time information of the second number of frame images includes steps described below. Offset data of the first number of frame images is acquired; the offset data is reversed, and a negative number of the reversed offset data is taken as offset compensation data; and the time information of the second number of frame images is offset according to the offset compensation data.

In conjunction with the preceding example, the time information of the first half of the number of frames may be offset, the time information of the last half of the number of frames may be compensated, and the compensation may be completely reversed. For example, the first half of the number of frames is 12 frames, the time offsets of the first 12 frames are 0, 1, 2, 3, 0, 1, 2, 3, 0, 1, 2 and 3, respectively, and then the time offsets of the next 12 frames are −3, −2, −1, 0, −3, −2, −1, 0, −3, −2, −1 and 0; and since the frame rate is 25 frames per second, the last frame remains unchanged. In this manner, after the offsetting, it can be ensured that the number of frames per second is fixed without the phenomenon of frame skipping. Moreover, the effect that the start time of a following second changes due to the offset of a previous second will not be caused between seconds by the watermark information adding.

In the preceding technical solution, optionally, after the watermark information is added to the video, the method further includes steps described below. In a case where a watermark information acquisition request is detected, the time information of the frame image in the video is acquired; and encoding information carried in the frame image in the video is determined according to the time information and a preset encoding manner.

In an embodiment, it may be that after a user sends the watermark information acquisition request, the time interval between multiple frame images in the video are acquired and compared with a standard time interval at the current frame rate to acquire offset information, and then the watermark information is decoded in the encoding manner used before to obtain the watermark content. In this manner in the technical solution, the watermark information can be added without affecting the information of the frame image in the video. In addition, this manner for adding the watermark information is imperceptible to users. Therefore, in a case where it is required to tracking the watermark information of the content related to the video information, information such as the source of the video can be obtained. For example, the problem of information leakage can be solved.

Figure 2:
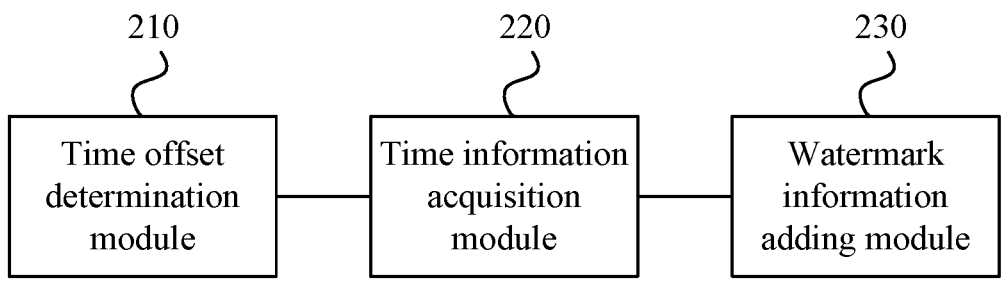
FIG. 2 is a structural diagram of a watermark adding apparatus according to an embodiment of the present application.

FIG. 2 is a structural diagram of a watermark adding apparatus according to an embodiment of the present disclosure. As shown in FIG. 2, the watermark adding apparatus includes a time offset determination module 210, a time information acquisition module 220 and a watermark information adding module 230. The time offset determination module 210 is configured to acquire watermark information to be added, and determine a time offset according to the watermark information. The time information acquisition module 220 is configured to acquire a video frame rate, and determine time information of a frame image in a video according to the video frame rate. The watermark information adding module 230 is configured to perform offset processing on the time information according to the time offset to add the watermark information to the video.

Optionally, the apparatus further includes a target code generation module. The target code generation module is configured to add at least one of a head identifier or a tail identifier to encoding information to obtain a target code. Accordingly, the time offset determination module 210 is configured to determine the time offset of the frame image in the video according to the target code.

According to the technical solution provided in the embodiment of the present disclosure, the watermark information can be embodied in the manner of the time offset. In this manner, watermark adding does not affect original information of the video and the frame image in the video and may be performed in a secret manner. Moreover, it is easy to track information such as video generation information according to the watermark information.

The preceding product may execute the method provided in the embodiment of the present application, and has corresponding functional modules for executing the method.

An embodiment of the present application further provides a storage medium including computer-executable instructions. The computer-executable instructions, when executed by a computer processor, are configured to implement a watermark adding method including steps described below. To-be-added watermark information is acquired, and a time offset is determined according to the watermark information; a video frame rate is acquired, and time information of a frame image in a video is determined according to the video frame rate; and offset processing is performed on the time information according to the time offset to add the watermark information to the video.

The storage medium is any one of various types of memory devices or storage devices. The term "storage medium" is intended to include: an installation medium such as a compact disc read-only memory (CD-ROM), a floppy disk or a magnetic tape device; a computer system memory or a random-access memory such as a dynamic random-access memory (DRAM), a double data rate random-access memory (DDR RAM), a static random-access memory (SRAM), an extended data out (EDO) RAM and a Rambus RAM; a non-volatile memory such as a flash memory and a magnetic medium (like a hard disk or an optical storage); a register or other similar types of memory components, etc. The storage medium may further include other types of memories or combinations thereof. In addition, the storage medium may be located in a computer system in which programs are executed, or may be located in a different second computer system connected to the computer system through a network (such as the Internet). The second computer system may provide program instructions for a computer for executing programs. The term "storage medium" may include two or more storage media which may reside at different positions (for example, in different computer systems connected through a network). The storage medium may store program instructions (for example, embodied as computer programs) which are executable by one or more processors.

Of course, in the storage medium including the computer-executable instructions provided in the embodiment of the present application, the computer-executable instructions may implement not only the preceding watermark adding operations but also related operations in the watermark adding method provided in any embodiment of the present application.

Figure 3:
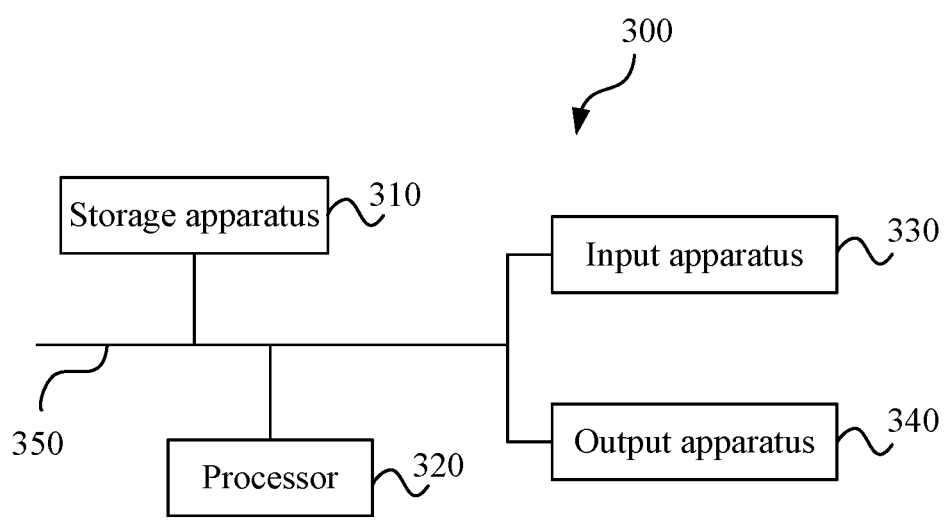
FIG. 3 is a structural diagram of a device according to an embodiment of the present application.

An embodiment of the present application provides a device in which the watermark adding apparatus provided in the embodiment of the present application may be integrated. FIG. 3 is a structural diagram of the device according to the embodiment of the present application. As shown in FIG. 3, the embodiment provides a device 300. The device 300 includes one or more processors 320 and a storage apparatus 310 configured to store one or more programs. The one or more programs, when executed by the one or more processors 320, cause the one or more processors 320 to implement the watermark adding method provided in the embodiment of the present application. The method includes steps described below. To-be-added watermark information is acquired, and a time offset is determined according to the watermark information; a video frame rate is acquired, and time information of a frame image in a video is determined according to the video frame rate; and offset processing is performed on the time information according to the time offset to add the watermark information to the video.

Of course, the processor 320 also implements the watermark adding method provided in any embodiment of the present application.

The device 300 shown in FIG. 3 is merely an example and is not intended to limit the function and use scope of the embodiments of the present application.

As shown in FIG. 3, the device 300 includes a processor 320, a storage apparatus 310, an input apparatus 330 and an output apparatus 340. One or more processors 320 may be disposed in the device, and one processor 320 is taken as an example in FIG. 3. The processor 320, the storage apparatus 310, the input apparatus 330 and the output apparatus 340 in the device may be connected via a bus or in other manners. Connecting via a bus is used as an example in FIG. 3.

As a non-transitory computer-readable storage medium, the storage apparatus 310 may be configured to store software programs, computer-executable programs and module units, such as program instructions corresponding to the watermark adding method in the embodiment of the present application.

The storage apparatus 310 may mainly include a program storage area and a data storage area. The program storage area may store an operating system and an application program required for implementing at least one function while the data storage area may store data created depending on use of terminals. Additionally, the storage apparatus 310 may include a high-speed random-access memory and may also include a non-volatile memory, such as at least one magnetic disk memory, a flash memory or another non-volatile solid-state memory. In some examples, the storage apparatus 310 may include memories which are remotely disposed relative to the processor 320, and these remote memories may be connected to the device via a network. Examples of the preceding network include, but are not limited to, the Internet, an intranet, a local area network, a mobile communication network and a combination thereof.

The input apparatus 330 is configured to receive input digital, character or speech information and generate key signal input related to user settings and function control of the electronic device. The output apparatus 340 may include devices such as a display screen and a speaker.

The device provided in the embodiment of the present disclosure may embody the watermark information in the manner of the time offset. In this manner, watermark adding does not affect original information of the video and the frame image in the video and may be performed in a secret manner. Moreover, it is easy to track information such as video generation information according to the watermark information.

The watermark adding apparatus, the storage medium and the device provided in the preceding embodiments may execute the watermark adding method provided in any embodiment of the present application, and have corresponding functional modules for executing the method. For technical details not described in the preceding embodiments, reference may be made to the watermark adding method provided in any embodiment of the present application.

What is claimed is:

1. A watermark adding method, comprising:
   acquiring watermark information to be added, and determining a time offset according to the watermark information;
   acquiring a video frame rate, and determining time information of a frame image in a video according to the video frame rate; and
   performing offset processing on the time information according to the time offset to add the watermark information to the video;
   wherein acquiring the watermark information to be added, and determining the time offset according to the watermark information comprises:
   acquiring the watermark information to be added, and encoding the watermark information in a preset encoding manner to obtain encoding information of at least two bits; and
   determining the time offset according to the encoding information of at least two-bits.

2. The method according to claim 1, after encoding the watermark information in the preset encoding manner to obtain the encoding information of at least two bits, further comprising:
   adding at least one of a head identifier or a tail identifier to the encoding information of at least two bits to obtain a target code;
   wherein determining the time offset according to the encoding information of at least two bits comprises:
   determining the time offset of the frame image in the video according to the target code.

3. The method according to claim 2, after determining the time offset of the frame image in the video according to the target code, further comprising: cyclically adding the time offset to get a cyclically added time offset;
   wherein performing the offset processing on the time information according to the time offset comprises:
   performing the offset processing on the time information according to the cyclically added time offset.

4. The method according to claim 1, after determining the time information of the frame image in the video according to the video frame rate, further comprising:
   acquiring a total number of frame images within a unit duration;
   wherein performing the offset processing on the time information according to the time offset comprises:
   performing offset processing on time information of a first number of frame images within the unit duration according to the time offset, and performing offset compensation on time information of a second number of frame images, wherein a sum of the first number of frame images and the second number of frame images is the total number of frame images within the unit duration.

5. The method according to claim 4, wherein performing the offset compensation on the time information of the second number of frame images comprises:
   acquiring offset data of the first number of frame images;
   reversing the offset data to get a reversed offset data, and taking a negative number of the reversed offset data as offset compensation data; and
   performing offset processing on the time information of the second number of frame images according to the offset compensation data.

6. The method according to claim 1, after performing offset processing on the time information according to the time offset, further comprising:
   in a case where a watermark information acquisition request is detected, acquiring the time information of the frame image in the video; and
   determining encoding information carried in the frame image in the video according to the time information and a preset encoding manner.

7. A non-transitory computer-readable storage medium configured to store a computer program, wherein the computer program, when executed by a processor, implements:
   acquiring watermark information to be added, and determining a time offset according to the watermark information;
   acquiring a video frame rate, and determining time information of a frame image in a video according to the video frame rate; and
   performing offset processing on the time information according to the time offset to add the watermark information to the video;
   wherein acquiring the watermark information to be added, and determining the time offset according to the watermark information comprises:
   acquiring the watermark information to be added, and encoding the watermark information in a preset encoding manner to obtain encoding information of at least two bits; and
   determining the time offset according to the encoding information of at least two-bits.

8. The non-transitory computer-readable storage medium according to claim 7, wherein the computer program, when executed by the processor, implements:
   acquiring the watermark information to be added, and encoding the watermark information in a preset encoding manner to obtain encoding information of at least two bits; and
   determining the time offset according to the encoding information of at least two-bits.

9. The non-transitory computer-readable storage medium according to claim 8, wherein the computer program, when executed by the processor, implements:
   adding at least one of a head identifier or a tail identifier to the encoding information of at least two bits to obtain a target code;
   wherein determining the time offset according to the encoding information of at least two bits comprises:
   determining the time offset of the frame image in the video according to the target code.

10. The non-transitory computer-readable storage medium according to claim 9, wherein the computer program, when executed by the processor, implements: cyclically adding the time offset to get a cyclically added time offset;
    wherein performing the offset processing on the time information according to the time offset comprises:
    performing the offset processing on the time information according to the cyclically added time offset.

11. The non-transitory computer-readable storage medium according to claim 7, wherein the computer program, when executed by the processor, implements:
    acquiring a total number of frame images within a unit duration;
    wherein performing the offset processing on the time information according to the time offset comprises:
    performing offset processing on time information of a first number of frame images within the unit duration according to the time offset, and performing offset compensation on time information of a second number of frame images, wherein a sum of the first number of frame images and the second number of frame images is the total number of frame images within the unit duration.

12. The non-transitory computer-readable storage medium according to claim 11, wherein the computer program, when executed by the processor, implements:
acquiring offset data of the first number of frame images;
reversing the offset data to get a reversed offset data, and taking a negative number of the reversed offset data as offset compensation data; and
performing offset processing on the time information of the second number of frame images according to the offset compensation data.

13. A device comprising a memory, a processor and a computer program stored in the memory and executable on the processor, wherein the processor, when executing the computer program, implements:
acquiring watermark information to be added, and determining a time offset according to the watermark information;
acquiring a video frame rate, and determining time information of a frame image in a video according to the video frame rate; and
performing offset processing on the time information according to the time offset to add the watermark information to the video;
wherein acquiring the watermark information to be added, and determining the time offset according to the watermark information comprises:
acquiring the watermark information to be added, and encoding the watermark information in a preset encoding manner to obtain encoding information of at least two bits; and
determining the time offset according to the encoding information of at least two-bits.

14. The device according to claim 13, wherein the processor, when executing the computer program, implements:
acquiring the watermark information to be added, and encoding the watermark information in a preset encoding manner to obtain encoding information of at least two bits; and
determining the time offset according to the encoding information of at least two-bits.

15. The device according to claim 13, wherein the processor, when executing the computer program, implements:
adding at least one of a head identifier or a tail identifier to the encoding information of at least two bits to obtain a target code;
wherein determining the time offset according to the encoding information of at least two bits comprises:
determining the time offset of the frame image in the video according to the target code.

16. The device according to claim 15, wherein the processor, when executing the computer program, implements:
cyclically adding the time offset to get a cyclically added time offset;
wherein performing the offset processing on the time information according to the time offset comprises:
performing the offset processing on the time information according to the cyclically added time offset.

17. The device according to claim 13, wherein the processor, when executing the computer program, implements:
acquiring a total number of frame images within a unit duration;
wherein performing the offset processing on the time information according to the time offset comprises:
performing offset processing on time information of a first number of frame images within the unit duration according to the time offset, and performing offset compensation on time information of a second number of frame images, wherein a sum of the first number of frame images and the second number of frame images is the total number of frame images within the unit duration.

18. The device according to claim 17, wherein the processor, when executing the computer program, implements:
acquiring offset data of the first number of frame images;
reversing the offset data to get a reversed offset data, and taking a negative number of the reversed offset data as offset compensation data; and
performing offset processing on the time information of the second number of frame images according to the offset compensation data.

19. The device according to claim 13, wherein the processor, when executing the computer program, implements:
in a case where a watermark information acquisition request is detected, acquiring the time information of the frame image in the video; and
determining encoding information carried in the frame image in the video according to the time information and a preset encoding manner.

* * * * *